(12) United States Patent
Rodriguez (10) Patent No.: US 6,510,477 B2
(45) Date of Patent: Jan. 21, 2003

(54) BUS SYSTEM

(75) Inventor: Pablo M. Rodriguez, Foster City, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 09/814,469

(22) Filed: Mar. 21, 2001

(65) Prior Publication Data

US 2002/0026547 A1 Feb. 28, 2002

Related U.S. Application Data

(63) Continuation-in-part of application No. 09/539,640, filed on Mar. 30, 2000.

(51) Int. Cl.[7] ............................................. G06F 13/00
(52) U.S. Cl. ..................... 710/110; 710/58; 710/100; 713/502; 713/600
(58) Field of Search ............................ 710/58, 61, 100, 710/110, 305; 709/201; 712/25; 713/600, 601, 501, 502, 503; 326/86, 90

(56) References Cited

U.S. PATENT DOCUMENTS

| 5,065,397 | A | * | 11/1991 | Shiobara | 370/453 |
| 5,305,443 | A | * | 4/1994 | Franzo | 710/110 |
| 5,349,610 | A | * | 9/1994 | Sakamoto et al. | 375/354 |
| 5,828,850 | A | | 10/1998 | Misaka | |
| 5,961,649 | A | * | 10/1999 | Khandekar et al. | 713/400 |
| 5,964,856 | A | * | 10/1999 | Wu et al. | 710/107 |
| 5,978,861 | A | | 11/1999 | Dearden et al. | |
| 6,026,456 | A | | 2/2000 | Ilkbahar | |
| 6,092,212 | A | * | 7/2000 | Muljono et al. | 709/201 |
| 6,317,801 | B1 | * | 11/2001 | Ilkbahar et al. | 710/110 |

FOREIGN PATENT DOCUMENTS

EP  0 848 333  6/1998

* cited by examiner

Primary Examiner—Xuan M. Thai
(74) Attorney, Agent, or Firm—Fish & Richardson P.C.

(57) ABSTRACT

A system and method for enhancing the performance of a parallel terminated bus. An implementation includes storing a minimum spacing for each transaction type in a memory, monitoring data transactions, performing a latch back operation if required, and executing a subsequent transaction following a prior transaction using a minimum spacing if the latch back operation does not occur.

22 Claims, 14 Drawing Sheets

FIG. 13 though CTT is used below, any type of parallel termination bus circuitry could be used. In addition, unless otherwise noted, references to drivers may include both data drivers and strobe drivers.

BUS SYSTEM

This application is a continuation-in-part of copending U.S. application Ser. No. 09/539,640 filed Mar. 30, 2000.

BACKGROUND OF THE INVENTION

The invention pertains to an apparatus and technique for operating a computer system. In particular, apparatus and techniques for controlling address bus signals to improve performance are described.

Figure 1:
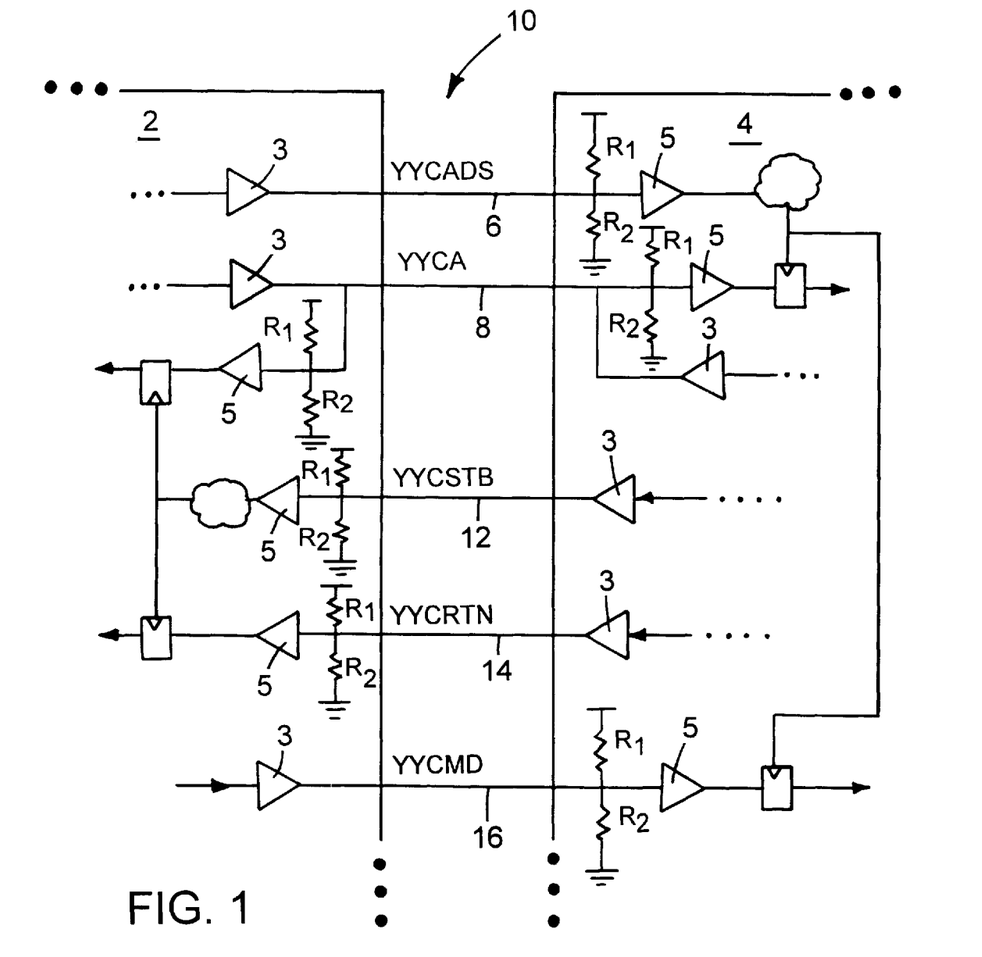
FIG. 1 is a simplified diagram illustrating various bus configurations in a parallel terminated bus system.

FIG. 1 is a simplified block diagram of a parallel terminated bus system 10 between a core chip 2 and a cache chip 4. The drawing illustrates various uni-directional and bi-directional buses that carry strobe, address, data and command signals. In particular, an address strobe bus 6 is uni-directional and is used to transmit address strobe signals from the core 2 to the cache 4. An address bus 8, however, is bi-directional so that address information signals may be exchanged between the core 2 and cache 4 in either direction. The cache strobe bus 12, return information bus 14 and command bus 16 are all uni-directional, with the cache strobe and return information signals being transmitted from the cache to the core, and the command signals transmitted to the cache from the core. Each bus includes drivers 3 having an impedance $Z_o$, and operable to drive signals to receivers 5. Each bus line is terminated at each receiver through a resistor $R_1$ between the bus and the source power supply Voltage $V_s$, and through resistor $R_2$ between the bus and ground. The bus therefore can be biased at a midpoint voltage when not driven by a driver. Such a configuration can make the rise and fall times of signals on the bus symmetrical, which is desirable in a source synchronous environment.

Any data exchange between drivers and receivers of two entities, such as between a processor and a memory device which may be on separate chips, is typically accomplished in a synchronous manner. That is, the chips have internal clocks that are sufficiently in alignment with each other so that data may be acquired on clock signal transitions. In addition, data exchanges may be accomplished source-synchronously, which means that the exchanges are based on strobe signal transitions that have been derived from a clock signal and are synchronized to their corresponding data.

A parallel termination protocol has been developed to ensure correct data signal operation for two or more bus agents across a large operating range. A parallel termination protocol may also be suitable for use with other entities that drive and receive data in a parallel environment. In an implementation, the parallel termination protocol requires that a signal must be driven at all times to prevent a signal from floating to an unspecified logic level. If certain signals were permitted to float, then the system would become unreliable. Such an occurrence may cause a fatal functional error in the system due to data transmission errors. To avoid such occurrences, the strobe signals could be uni-directional. Alternately, the parallel terminated protocol may specify that a bus agent designated as the default bus master will synchronously time the drive cut-off points to occur when another bus agent would drive a signal onto the bus, for example, to return data requested by the bus master. The parallel terminated protocol may also specify that the default bus master is to source-synchronously latch the value on the bus, turn on its drivers, and drive the latched value back onto the bus on the arrival of the last strobe signal for the reply sent by the cache. On certain occasions a prioritization of latched and outgoing data is accomplished to ensure correct operation.

DETAILED DESCRIPTION

Figure 2:
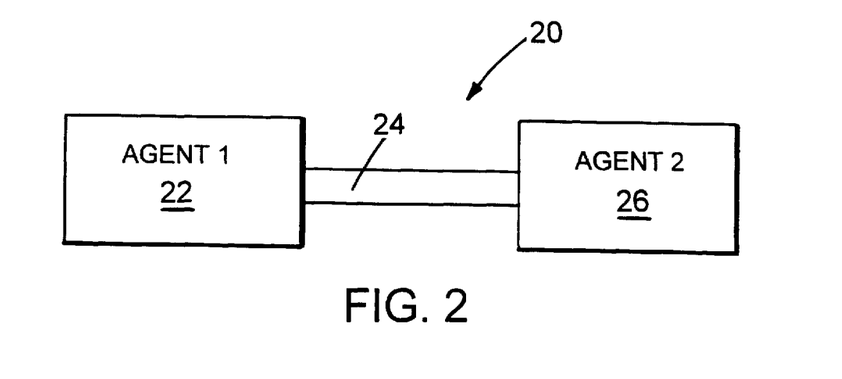
FIG. 2 is a simplified block diagram of a parallel terminated bus system according to an aspect of the invention.

FIG. 2 is a simplified block diagram of a center tapped terminated system 20 including a first agent 22 connected to a second agent 26 via a parallel terminated bus system 24. The first and second agents are capable of driving data, control, address, strobe and other signals onto the bus, and are configured to capture the various data signals. At least the strobe signals are continuously driven on the bus 24 by drivers (not shown) associated with either the first agent 22 or the second agent 26. In general, when the last strobe signal from the first agent is received, the second agent proceeds to source-synchronously turn On its driver. When data or strobes are expected from the second agent, the drivers of the first agent are to be synchronously turned Off.

In an implementation, the first agent 22 may be a processor or core, the second agent 26 may be a cache, and the bus 24 may be a back-side cache bus (BSB). These components may be included on a single integrated circuit chip or may be separate components located on different chips. The core may be defined as the logic circuitry of a semiconductor chip processor. Both the core and cache include drivers and receivers for driving signals onto, and receiving signals from, the BSB. Other interface bus configurations need not employ a BSB. Furthermore, although the example implementation described below includes a center-tapped terminated (CTT) bus, any type of parallel termination bus circuitry could be used. In addition, unless otherwise noted, references to drivers may include both data drivers and strobe drivers.

Receivers depend upon the BSB signal integrity to be such that a strobe signal transition will not be detected when one is not occurring. If a strobe signal is permitted to float on the BSB, then signal integrity may be compromised. A fatal system error may then occur that may require an undesirable re-boot of the processor. If a strobe signal, for example, is left to float to an undetermined value, then the logic or the circuit located after the receiver may begin malfunctioning. Even if a receiver is not expecting to acquire data, if a strobe signal or any other signal is permitted to float on the BSB then power will be wasted because of the large crowbar current in the receiver.

Figure 3:
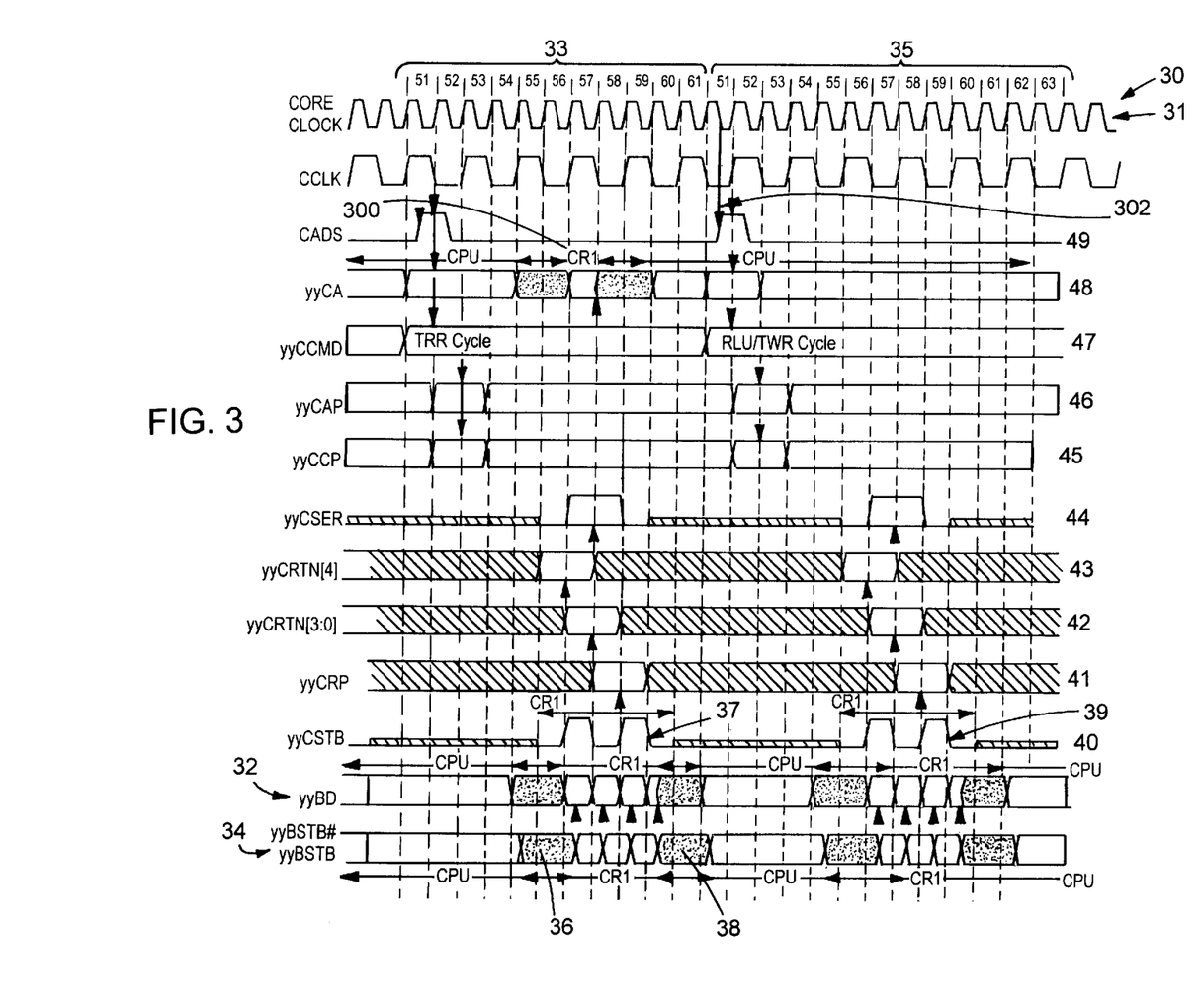
FIG. 3 is a timing diagram of a back-side bus (BSB) center-tapped terminated (CTT) protocol read cycle in a zero transmission line delay environment.

FIG. 3 is an illustrative implementation of a timing diagram 30 of a BSB, CTT protocol read cycle in a 1:1 ratio of the processor core clock 31 to the BSB strobe signals in a zero transmission line delay environment. This environment allows signals to be described in an idealized manner where propagation delays are ignored. The 1:1 ratio of the core clock 31 to the data strobes has been chosen here for ease of understanding, and indicates that the switching speed is substantially simultaneous. Other ratios could be used, and in real world operation, the ratio could be different and the line delay may be significant.

FIG. 3 illustrates a data read and tag read function 33 (core clock cycles 51 to 61) followed by a tag write with line read function 35 (core clock cycles 51 to 61). In the example transactions, the data signals 32 and data strobe signals 34 are bi-directional, but the address strobe signals 49 and cache strobe signals 40 are uni-directional. The CTT protocol regarding data signals 32 specifies a pre-drive window 36 and a post-drive window 38 of 2 clock cycles for the strobe signals 34. The pre-drive and post-drive windows are designed to prevent a signal from floating on the BSB during a master changeover by ensuring drive overlap between the masters over an entire range of operating frequencies.

A CTT protocol requires that the uni-directional and bi-directional signals and strobe signals be continuously driven on the BSB by the processor or the cache. On reception of the "last strobe" signal for a particular transaction, the processor should asynchronously (source-synchronous with the strobe) turn On its driver. The "last strobe" signal may be defined as the strobe signal for a transaction that is not closely followed by strobe signals of another transaction, which concept will be explained in more detail below with reference to FIG. 4A. Referring to the cache strobe signals 40 in FIG. 3, the last strobe signal for the data read and address read function 33 is depicted at 37, and the last strobe signal for the tag write with line read function 35 is depicted at 39. When the processor next expects to receive data signals from the cache, then it should synchronously turn its drivers Off. Thus, the processor cut-off points should be synchronously timed to occur at the earliest time that the processor expects to receive data on the BSB. Although in theory this seems simple to accomplish, under actual system operating conditions it is difficult to establish if a particular strobe signal edge is the "last strobe" that requires generation of a latch-back signal. In the following discussion, the latch-back signal is defined as the signal resulting from a latch-back process which occurs when a receiving agent captures the value on the bus from the transmitting agent, for use in driving it back on the bus if required. The described technique is also used to prevent signals from floating on the uni-directional buses or signal lines.

Referring again to FIG. 3, strobe signals 49 are sent from the processor to the cache for initiating the transactions. The cache will expect command signals 47 and address signals 48 during each of the transactions 33 and 35 among others. With respect to the data read and address read transaction 33, pre-drive signals for address line 48 may occur at cycles 55 and 56, and post-drive signals may occur at cycles 58 and 59. The valid range for data is cycle 57. At the arrival of the first falling edge of cache strobe 40, which corresponds to the end of cycle 57, a latch back is performed on address signal line 48 and the processor drives a signal 300 on to the address bus. The cache may operate to return address signals at cycle 57 which may take multiple cycles to arrive at the processor. Consequently, the next transaction, the tag write with line read 35, must wait for the next address strobe 302 (at cycle 51) to occur before initiating the transaction. The next address strobe 302 can only be sent when the second transaction 35 would not corrupt the first transaction 33. But in some cases an address reply signal 48 (cycles 55 through 59) is not required and the cache need not return the address and the processor may not cut off (release) and continue driving. In such cases, even if the processor performs a latch back, no harm will be done because the value driven back onto the address bus by the cache will be the same value the processor is already driving. However, to achieve enhanced performance, if a latch back is not required and is not performed, then the transaction 35 can be made to occur at an earlier time to more closely follow the transaction 33. Such operation results in an overall improvement in data throughput for the processor system when applied to all possible address bus transactions that do not require a latch back to occur.

There must always be enough spacing between transactions, including when an address is driven onto the bus by the cache during the reply to a transaction. There is a natural delay for the reply, and the processor will just wait some cycles longer for the address signal to arrive. But if the cache is not returning an address, and if the processor is driving the address bus, then the core is not expecting an address to be returned by virtue of cut-off signals from the core. In such a case, the latch back need not occur and the next transaction can be moved to occur closer to the prior transaction. Care must be taken when moving up the time of occurrence of the next transaction to ensure that the current transaction is not corrupted. In an implementation, the minimum spacing for each transaction type is stored in a memory, and the core is programmed to check the minimum spacing requirements for the current transaction type in the memory before moving up the next transaction. A method for implementing the technique involves counting the last strobe signals, and performing a latch back only if a drive enable signal is off and if the outstanding transactions equal the last strobe count. Otherwise, a latch back is not performed and the transaction may be moved closer to the prior transaction to enhance system performance. The circuitry and method for performing a latch back when required are explained below.

Figure 4A:
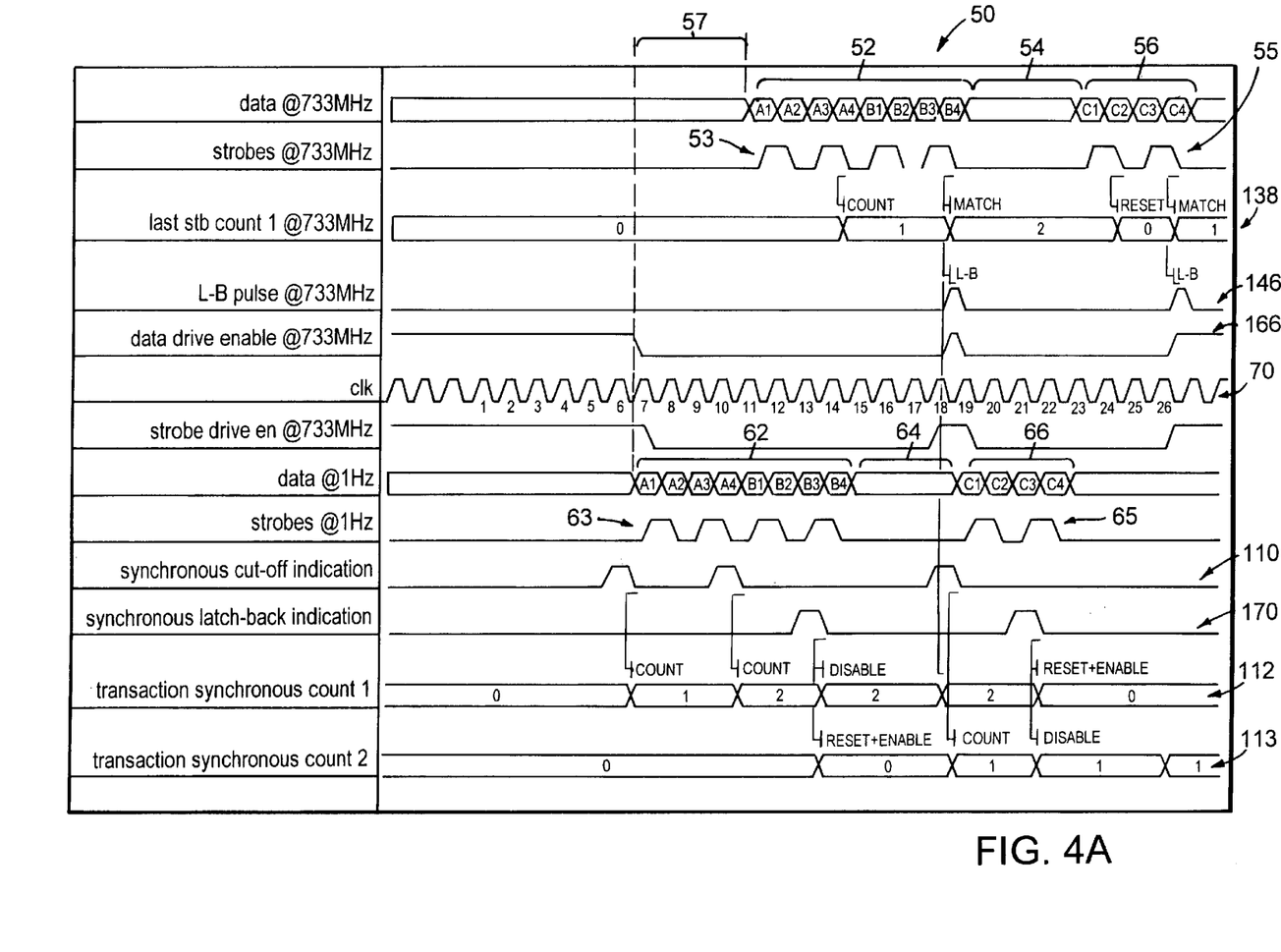
FIG. 4A is a timing diagram to illustrate CTT cut-off and latch-back operation according to an aspect of the invention.

FIG. 4A is a timing diagram 50 for explaining the CTT protocol cut-off and latch-back operation signals for a processor and a cache when operating at two extremes: the processor reading data at a high frequency (in this example 733 Megahertz (MHz)) and at a low frequency (in this example 1 Hertz (Hz)). In the case of high frequency operation, data signals 52 designated as A1–A4 and B1–B4 are followed after a delay 54 by data signals 56 designated as C1–C4. Included with the data signals are counterpart strobe signals 53 and 55, which may be differential signals (e.g. one is active high and the other is active when low) to increase system reliability and performance. For low frequency operation, data signals 62 designated as A1–A4 and B1–B4 are followed after a delay 64 by data signals 66 designated C1–C4. Again included are counterpart strobe signals 63 and 65. The interval 57 is the additional transmission line delay in terms of clock cycles when operating at the higher frequency (which in this example is about 4 clock cycles) as calculated by an equation:

transmission line delay divided by the core clock period.

The clock signal 70 indicates that in low frequency operation it took 6 cycles from the time a cache read transaction was requested to when the first data block A1 of data signals 62 arrives at the processor assuming the transaction began at clock cycle one. Thus, the cache latency for the data signals 62 is 6 cycles. For high frequency operation, referring to the data signals 52, the cache latency is 10 cycles. Therefore, for different operating frequencies the cache latency will be different and reception of data will occur during different clock cycles. For example, comparing back-to-back read transactions at the frequencies, the last data chunk B4 of data signals 62 and the data chunk A4 of the data signals 52 could be received roughly at the same time (during clock cycle fourteen). If the data chunks C1 to C4 did not exist, then in the case of low frequency operation the processor should perform a latch-back operation at about clock cycle fourteen, while in the case of high frequency operation the processor should perform a latch-back operation at about clock cycle 18.

The spacing between transactions also affects whether or not the processor should perform a latch-back operation. For example, FIG. 4A shows that a time spacing 54 or 64 between data chunks that is less than four (4) clock cycles typically allows enough time for the cache pre-drive and post-drive strobe signals to overlap, assuming a two clock cycle of pre-drive and a two clock cycle of post-drive, and thus the latch-back should not be done. Since the post-drive signal after data chunk B4 is two cycles and the pre-drive signal before data chunk C1 is two cycles, there will always be an overlap signal or a known value on the BSB. If the processor or the cache is driving a uni-directional signal, then a latch back may not be needed.

The driver cut-off and latch-back circuitry must also be able to operate from a very low frequency (~0 Hz) up to the fastest operating frequency of the processor. This frequency independent operation allows smooth manipulation of the integrated circuit in the test environment and ensures that components will function in production. In order to operate in this manner, the processor driver cut-off is initiated at the same clock edge (synchronously) as the cache response. Since this response depends on cache latency that may not be the same on different system configurations, some flexibility may be introduced by including a knob called "cut-off knob". A knob may be defined as an adjustment mechanism for setting control values in a semiconductor chip. A knob may be hardware or software based, and is used to change the behavior of the processor integrated circuit chip. The cut-off knob may be tied to a cache latency knob operable to adjust for fast or slow cache response time. The cut-off knob is preferably software based to facilitate adjustment of the processor once the cache latency is known for a particular system. Systems may have different knob settings to ensure frequency independent, fully-configurable operation of the cut-off and latch-back operations. Multiple knobs may be needed to control cut-off points for different signals.

Figure 4B:
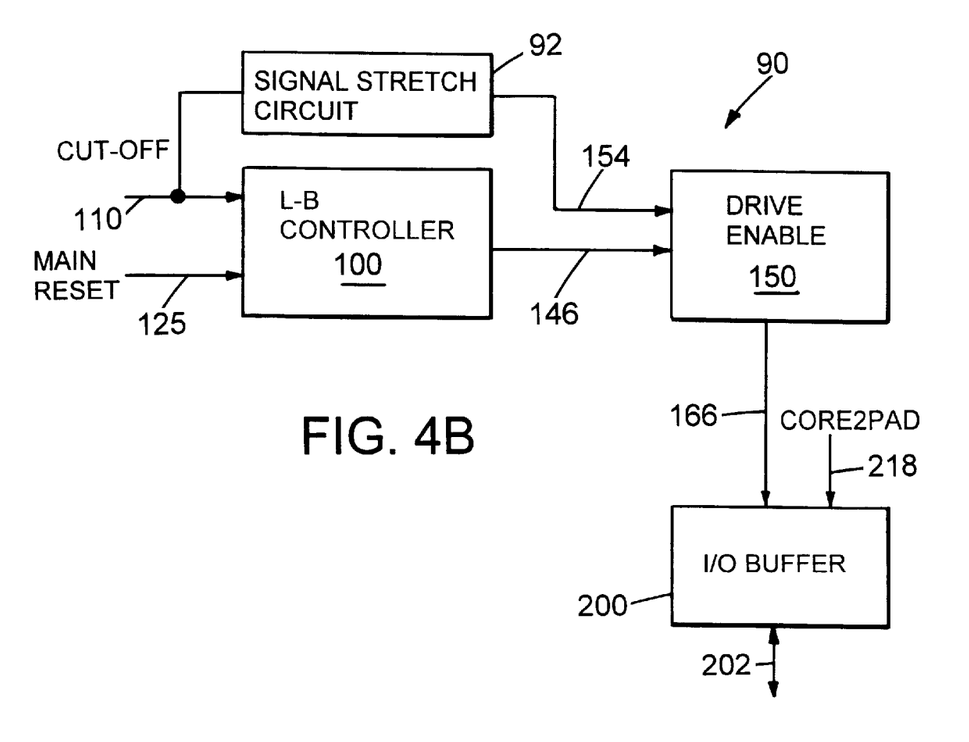
FIG. 4B is a block diagram of a system according to an aspect of the invention for driving a signal onto the BSB.

FIG. 4B is a simplified block diagram of a system 90 for driving a signal onto the BSB when required. A latch-back controller circuit 100 includes a BSB cut-off signal input 110 and a main reset input 125, and operates to generate a latch-back pulse on line 146 to a drive enable circuit 150. Signal stretch circuitry 92 operates to provide a stretched BSB cut-off signal input on line 154 to the drive enable circuit 150 (which will be explained below with reference to FIG. 6), and a drive enable signal is generated on line 166 for an input/output buffer circuit 200. The input/output circuit 200 generates a signal having a particular value on input/output PAD 202 for driving onto the BSB, and includes a CORE2PAD input line 218. The CORE2PAD is a line that connects a processor core to the bus line. Implementations of the latch-back controller circuit, drive enable circuit and input/output buffer circuit are described below with regard to FIGS. 5 to 7.

Figure 5:
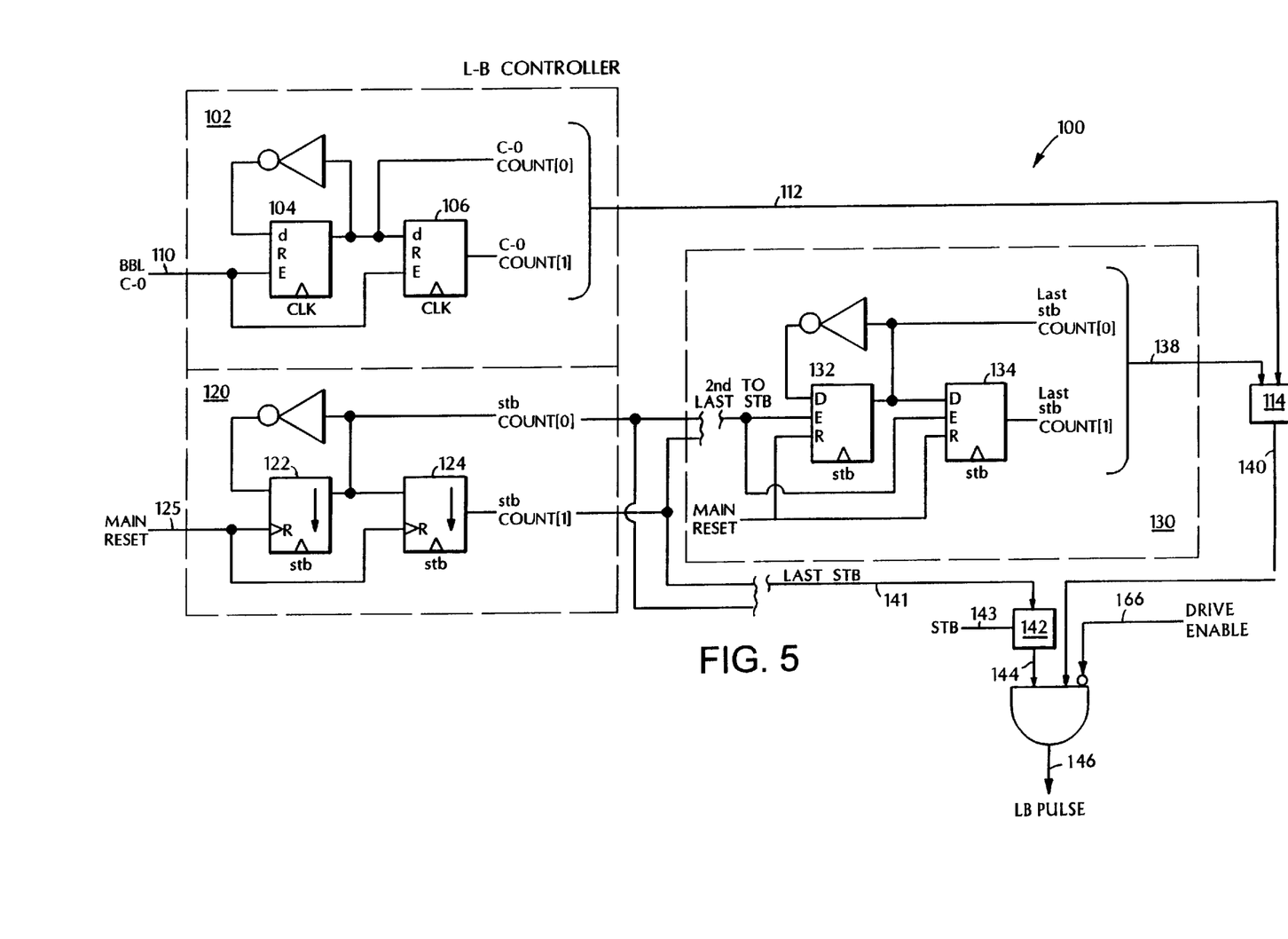
FIG. 5 is a block diagram of a latch-back controller according to an aspect of the invention.

FIG. 5 is a block diagram of an implementation of a latch-back controller circuit 100 which may be implemented as a part of a processor. The latch-back controller circuit operates to count the requests that have been issued and to count the replies received, and when these counts are equal then it issues a latch-back instruction. In the present implementation, there is a separate cut-off signal for the data and another for all other signals that may be input to the processor. The latch-back controller includes a synchronous BSB cut-off counter circuit 102, and two source synchronous strobe counter circuits 120 and 130. The BSB transaction counter circuit 102 keeps track of issued processor transactions, and the source synchronous counter circuits 120 and 130 keep track of cache replies that have been received for those transactions.

In the present implementation, the BSB transaction counter circuit 102 is a two-bit counter that includes a first core clocked flip-flop 104 and a second core clocked flip-flop 106, each having data, reset and enable inputs. A BSB cut-off signal is fed on line 110 to both flip-flops, and the circuit 102 operates to count the number of cut-off signals and output the count on line 112 to a comparator circuit 114. Cut-off signals are sent by the core some number of clocks after each and every transaction is initiated on the bus. If the core is expecting a reply on a particular bus, it will send the BSB a cut-off signal to indicate it to turn off the drive enable signal for that bus. For example, if the drive enable signal is off, then the core is expecting a reply from the cache and thus a cut-off signal is generated. Also, a latch-back indication is sent every time the core recognizes that the separation between two transaction groups is large enough for a latch-back to take place.

Referring again to FIG. 5, the two-bit counter circuit 120 includes two asynchronous flip-flops 122 and 124 running source-synchronously on the strobe. It should be understood that implementations including other than two-bit counters and more or less than two flip-flops could be utilized. After a main reset signal is received on line 125, the circuit 120 counts each strobe toggle, and the count is input to the two-bit counter circuit 130. The circuit 130 includes two asynchronous reset flip-flops 132, 134 which generate a count of the last strobe on line 138 which is input to the comparator 114. The output of the comparator 114 is fed on line 140 to And circuit 145, which also is connected to line 144. Referring to both FIGS. 4A and 5, if the count of the cut-off signals (issued transactions) on line 112 equals the last strobe count (count of replies received) on line 138, and the drive enable is off, then the signal on line 140 allows an edge signal 144 to be propagated on line 146. The last strobe signal on line 141 is computed on the edge prior to the last edge of a full set of strobes, and this computation is done to ensure speed of latch-back pulse generation. The signal on line 140 is stable because the circuit 102 is locked or frozen when a latch-back indication is received from the core. The edge signal 144 is therefore generated at the last strobe edge of the cache reply by a pulse generator circuit 142 which uses the strobe as an input 143. The output 146 is zero (ground) most of the time, except when the latch-back is to be done. An active signal on line 140 indicates that the number of transactions issued and replies received is equal. When that occurs and a drive enable signal 166 is off, then a latch-back is done by the processor on the BSB. The count gets reset again during the reply following the transaction that caused a latch-back to occur. This is done so that it is feasible to do a latch-back for the following transaction as well.

Multiple cut-off counter circuits (102) may be needed if transactions can be issued before the latch back for outstanding transactions occurs. Thus, outstanding cache transactions are tracked as data is being transferred with at least one of the counters. For example, if two counter circuits are used, the counters would alternate every time the core sends a synchronous latch-back indication 170 (FIG. 4A), the old counter indication 112 freezes its value, while the new counter indication 113 resets itself and enables itself to count cut-off signals. When data is transferred from the cache to the processor over the BSB, the transaction is tracked with the source synchronous counter circuit 120. When the synchronous counter and the source synchronous counters match, a signal is driven on the BSB to ensure that no signals are permitted to float. Thus, as transactions return data, latch-back is only performed when the synchronous and source synchronous counters match, and the latch-back controller issues a latch-back pulse (L-B Pulse) on the last edge of an incoming strobe signal.

Figure 6:
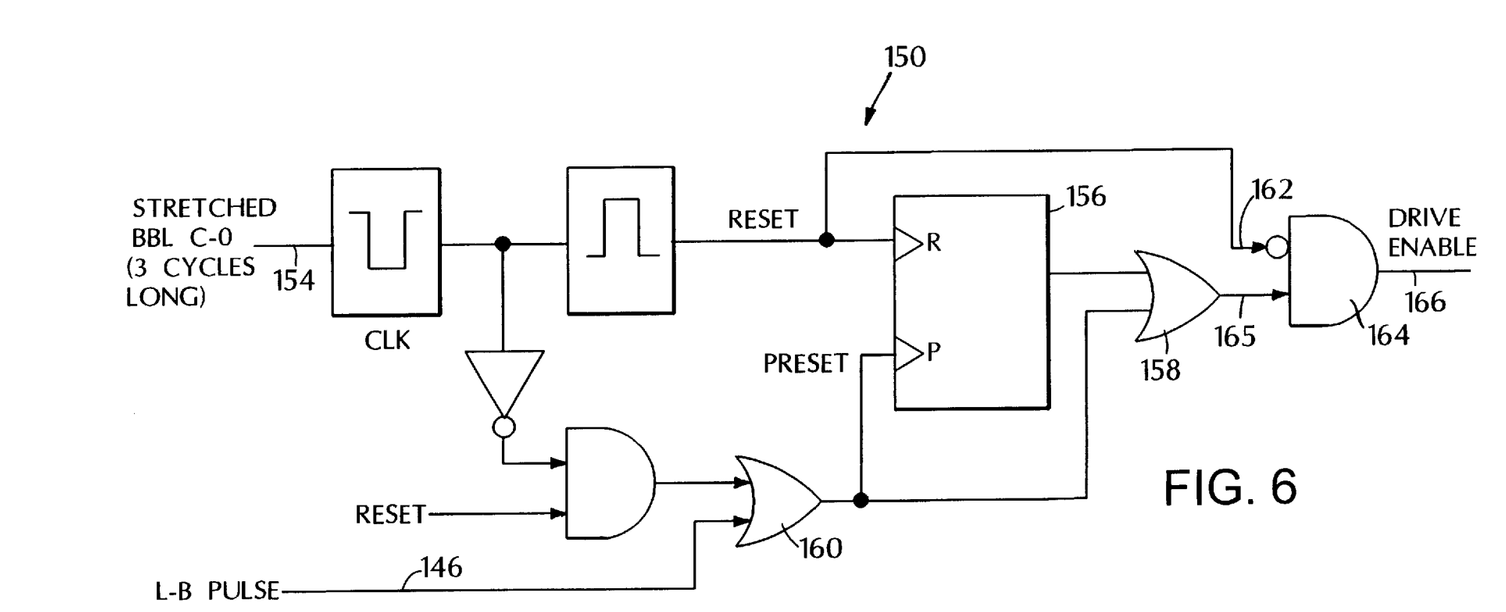
FIG. 6 is a block diagram of a drive enable circuit according to an aspect of the invention.

FIG. 6 is a block diagram of a drive enable circuit 150. An asynchronous reset-preset flip-flop 156 operates to produce a zero or low output when the reset signal is high, and a one or high output when the preset signal is high. The reset-preset flip-flop 156 also operates as a priority flip-flop to generate a zero or low output if the reset signal and the preset signal are both simultaneously high. A drive enable output on line 166 (see also FIG. 4A) determines whether or not the processor is to drive a signal on the BSB. The drive enable circuit 150 receives a synchronous cut-off indication signal on line 154 for turning Off the strobe and/or the data drive enable signal. The same BSB cut-off signal that is input to the BSB strobe counter circuit 102 of FIG. 5 on line 110 is input on line 154 and each cycle is stretched to a 3 cycle duration to ensure that the BSB is cut-off even after a substantially simultaneous preset indication occurs at the same time as a reset indication. The asynchronous preset-reset latch 156 is connected to an AND circuit 164, and the inverse of the stretched and latched BSB cut-off signal is input on line 162 to the AND circuit 164.

The drive enable circuit 150 of FIG. 6 is complex because there are cases when it appears that a latch-back should be done but a cut-off indication arrives in time to prevent it. The cut-off pulse should have priority over the latch-back pulse so that no signal is driven onto the BSB a certain number of clocks following an issued transaction. Similarly, if a latch-back indication and a cut-off indication occur simultaneously, then the cut-off pulse should have priority. The drive enable circuit 150 ensures that cut-off indications are prioritized over latch-back indications, allowing for the processor to drive a signal even for very short intervals when the cache pre-drive signals and post-drive signals do not overlap. Therefore, the drive enable circuit handles cases that may occur during system operation wherein apparently contradictory signals are generated.

Figure 7:
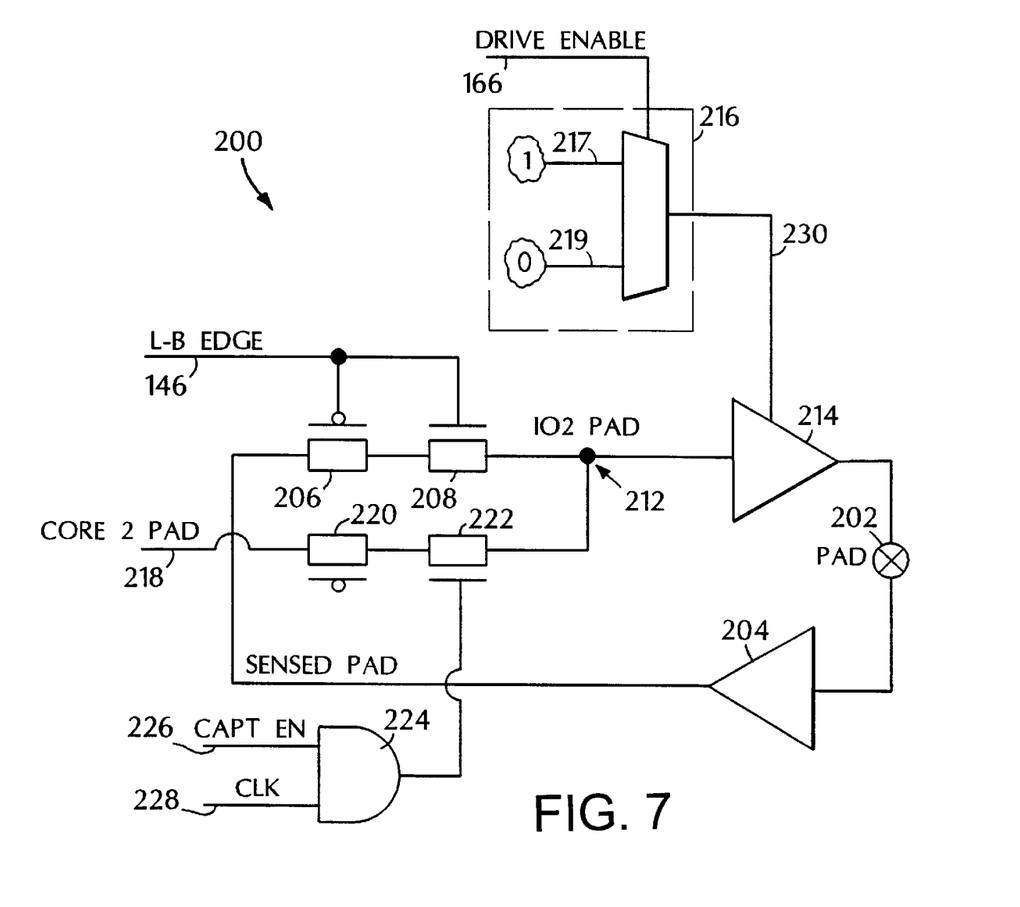
FIG. 7 is a block diagram of an input/output buffer circuit according to as aspect of the invention.

FIG. 7 is a block diagram of an input/output buffer circuit 200 illustrating how the latch-back pulse and drive enable signal are used to ensure correct functioning of the BSB. When the cache stops driving and the processor should start driving in the absence of further transactions, the value on the bus at the time (which the cache was driving) should be used. The circuit 200 operates to capture that value for such use.

Referring to FIG. 7, the PAD 202 indicates the actual wire connecting the processor to the cache. Thus, the value of the last signal from the cache will appear at this point and will be placed in a buffer 204, which is connected to latches 206, 208. The latches 206 and 208 are clocked by the latch-back signal on line 146 output from the latch-back controller circuit 100 of FIG. 5. Thus, when a latch-back pulse signal is issued, then the value of the signal at 202 is latched into IO2 PAD 212. The buffer 214 will then drive the signal value onto 202 when a drive enable signal on line 230 is On (which is generated from a drive enable signal on line 166, the output of drive enable circuit 150 of FIG. 6). A multiplexer circuit 216 operates to quickly drive a signal onto line 230 indicating a drive enable to turn On buffer 214 when required.

In addition to operating in the manner described above, FIG. 7 may operate to drive out a Core2Pad signal present on line 218 onto the PAD 202. Line 218 originates from the chip core for data writes, and is connected to latches 220 and 222. The latch 220 is clocked by the core clock, and the latch 222 is clocked by the output of an AND circuit 224. The AND circuit has a Capture Enable input 226 and a clock input 228. The Capture Enable input 226 is controlled by the processor and operates to send the value of the Core2Pad signal on line 218 to IO2PAD 212 only when the drive enable signal on line 226 is present which only occurs when the processor intends to do a data write, thus preventing any contention to write a value onto IO2 PAD. Thus, the captured last value is only driven out onto the BSB when needed. In summary, when a latch-back occurs, the current value on the BSB is sampled in the IO2Pad node 212 and it is driven out. When the BSB wants to drive strobes and/or data out, it does so through the Core2Pad 218 to IO2Pad 212 path. A carefully controlled capture Enable signal ensures that no contention occurs in the IO2PAD bus node.

Figure 8:
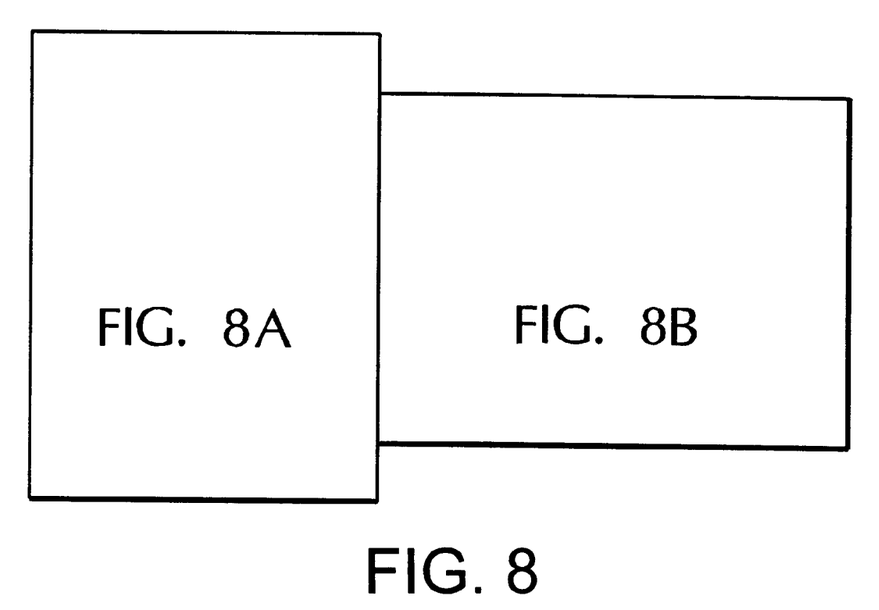
FIG. 8 is a schematic diagram of an implementation of a CTT controller.
Figure 8A:
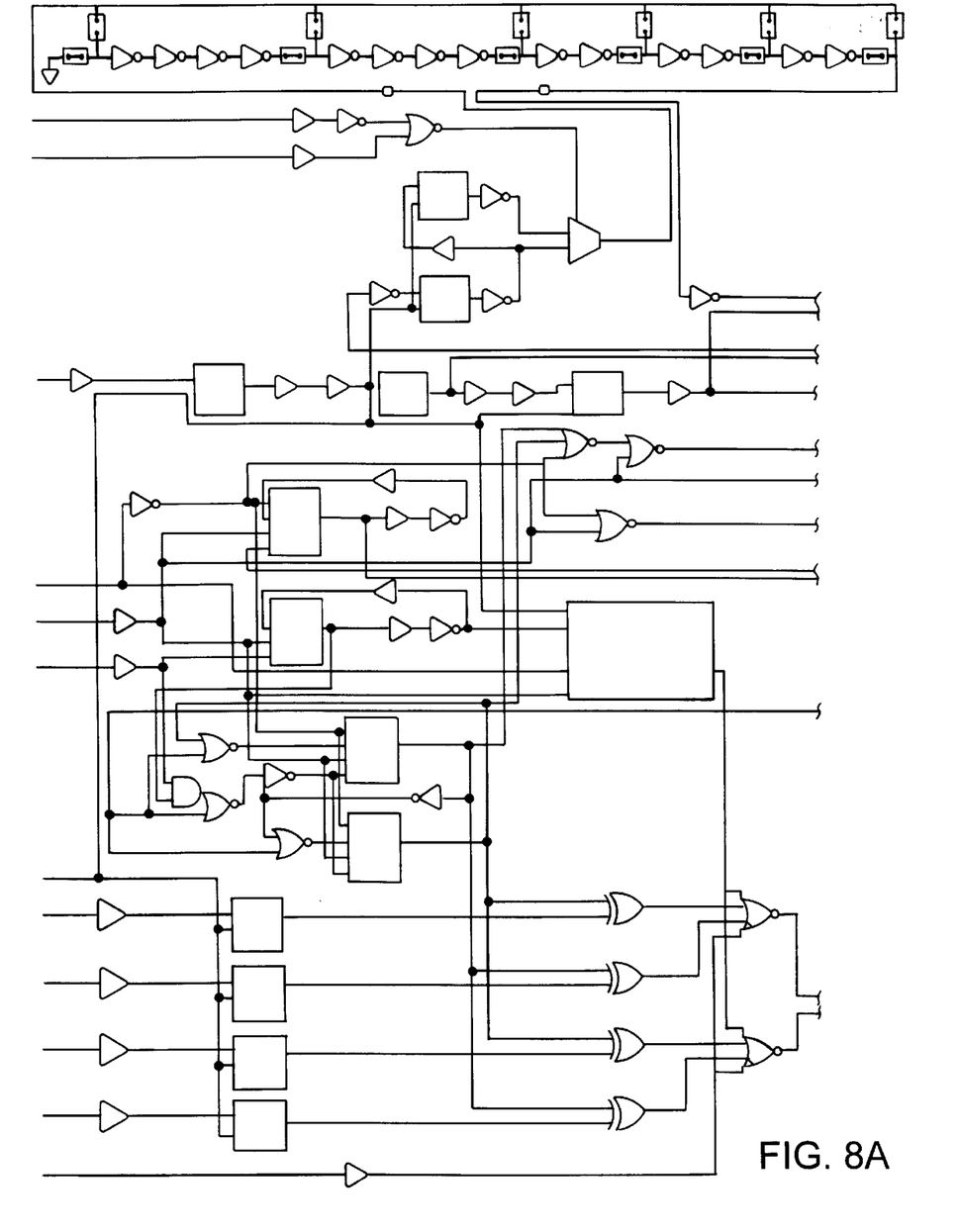
Figure 8B:
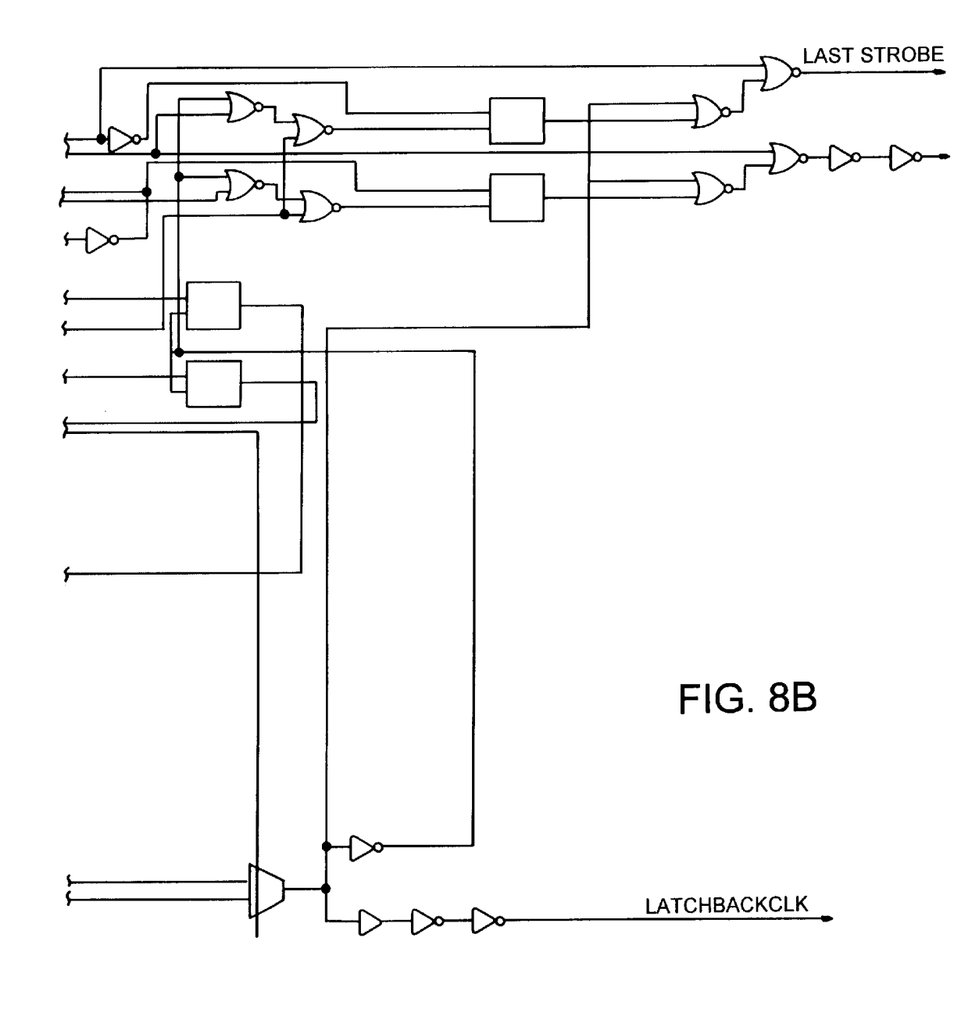
Figure 9:
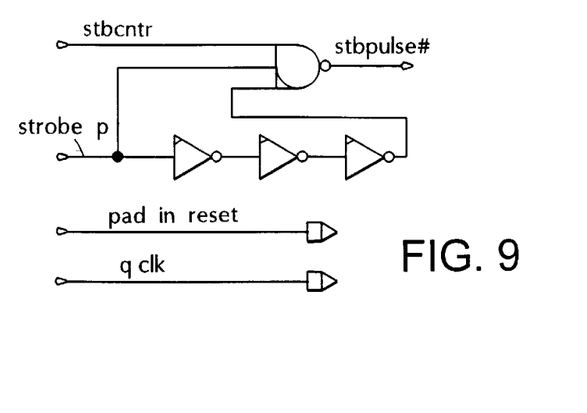
FIG. 9 is an implementation of a strobe pulse generation circuit.
Figure 10:
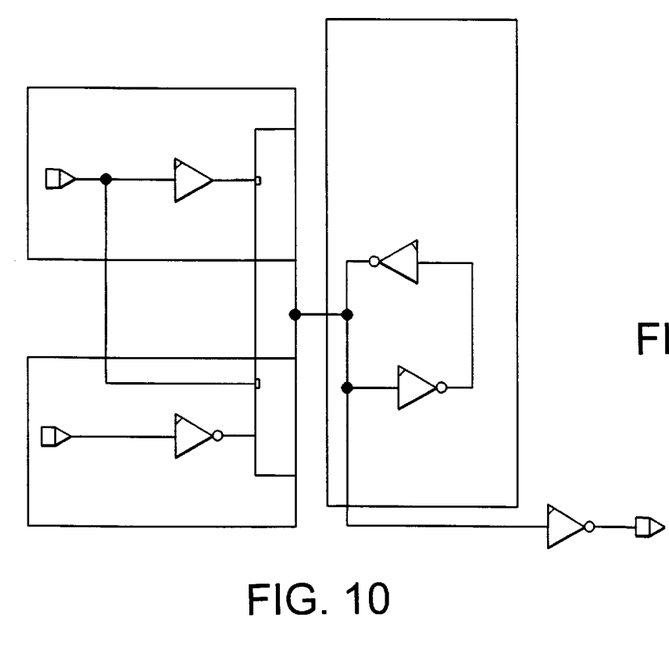
FIGS. 10 and 11 illustrate implementations and of a preset-reset priority flip-flop.
Figure 11:
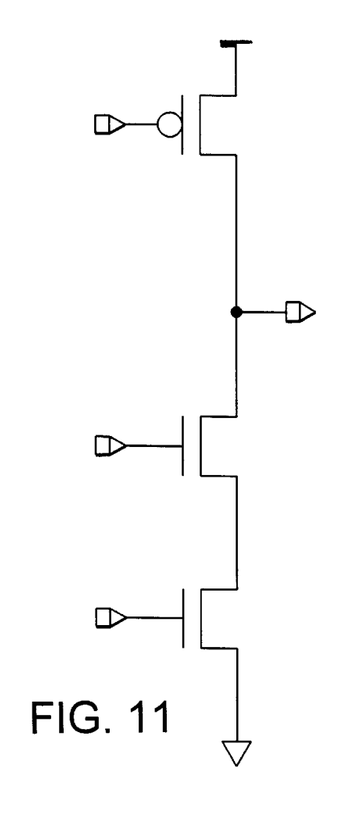
Figure 12:
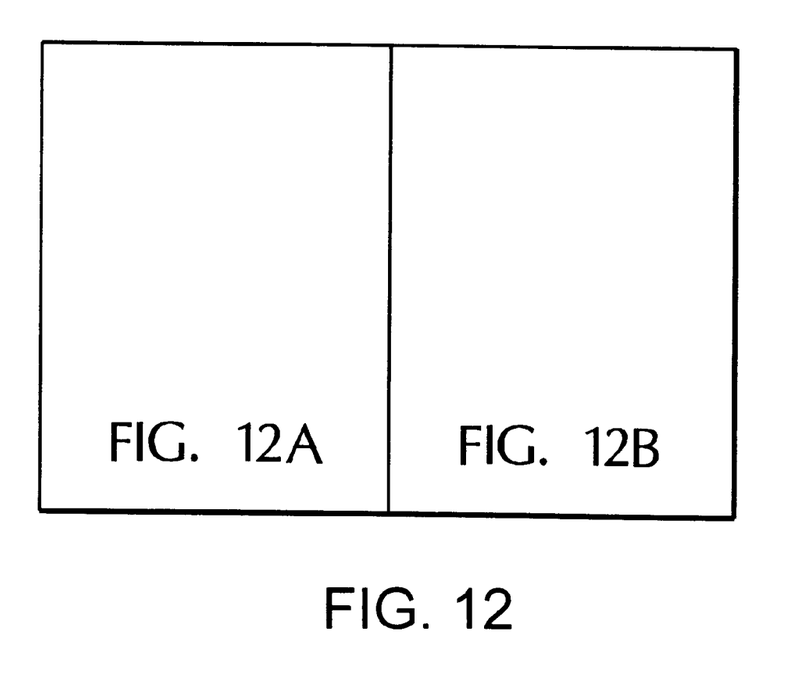
FIGS. 12A and 12B are circuit diagrams of an implementation of an Input/Output buffer control circuit and a logic control circuit.
Figure 12A:
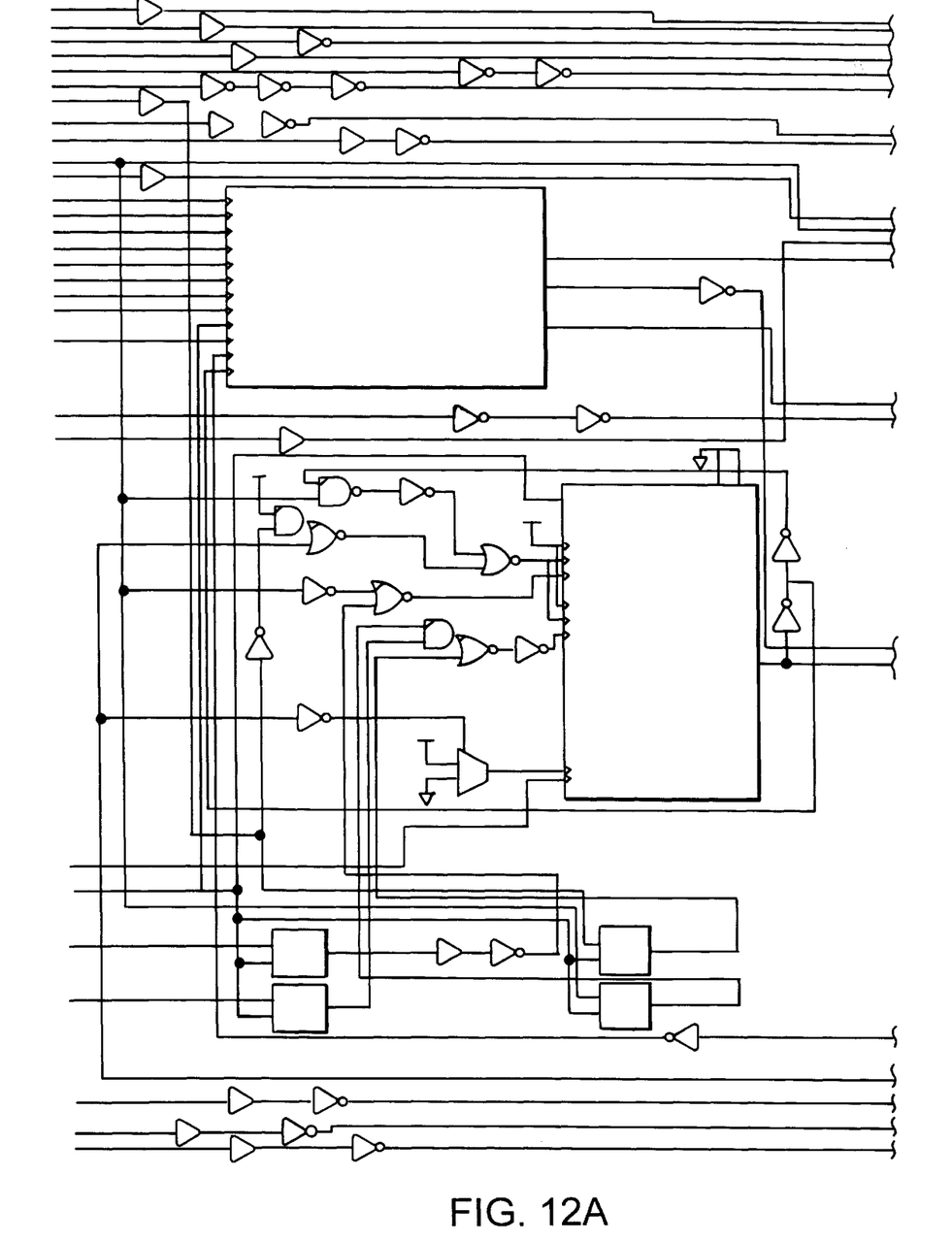
Figure 12B:
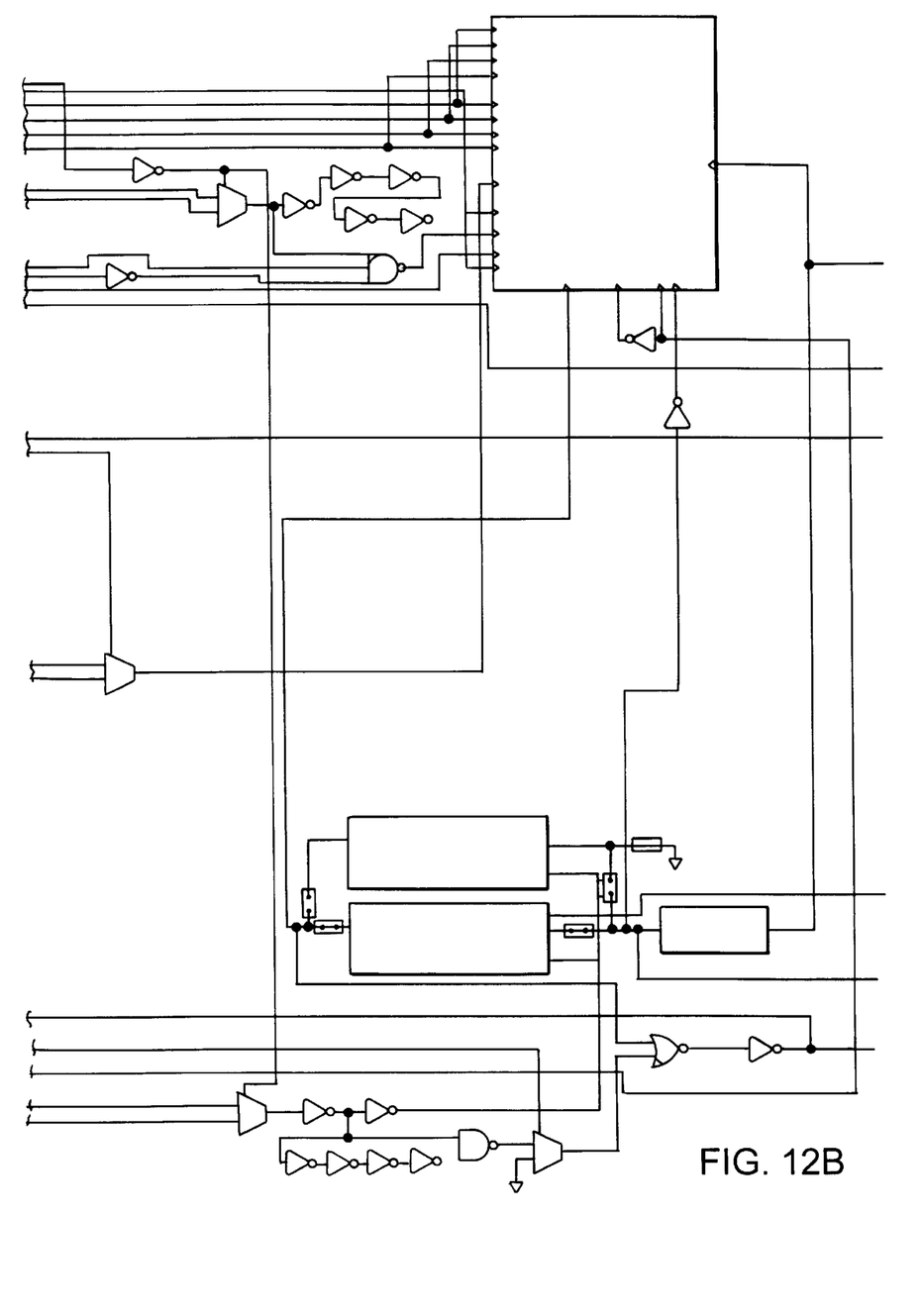
Figure 13:
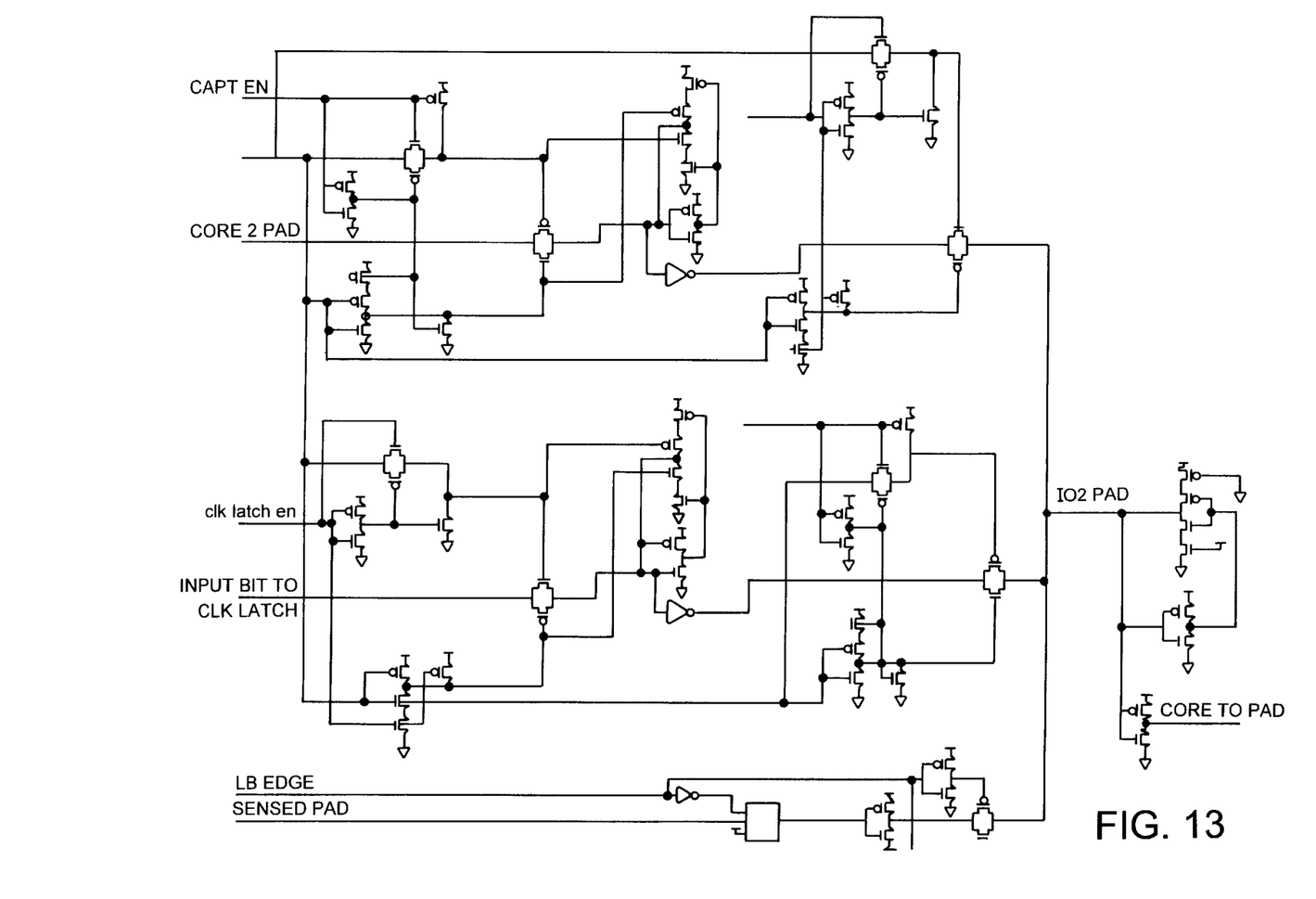
FIG. 13 illustrates how the ratio logic controls the flow of data from "Core2Pad" and "SensedPad" to "IO2Pad".

FIG. 8 is a CTT controller schematic diagram of an implementation of latch-back controller circuitry and drive enable generation circuitry described above with reference to FIGS. 5 and 6. FIG. 9 is an implementation of a strobe pulse generation circuit. FIGS. 10 and 11 illustrate implementations and of a preset-reset priority flip-flop. FIGS. 12 and 13 are circuit diagrams of an implementation of an Input/Output buffer control circuit and a logic control circuit. FIG. 13 illustrates how the ratio logic controls the flow of data from "Core2Pad" and "SensedPad" to "IO2Pad".

The described techniques turn On and Off the processor drive enables in such a way as to ensure that the strobe signals and/or data signals on the BSB are never left to float. The techniques and circuit implementations described herein also significantly reduce the occurrence of inter-symbol interference (ISI) in the bus that connects together various entities that drive and receive signals. In addition, the techniques described regarding operation of the address bus to move transactions closer together result in higher throughput of data.

Other implementations are within the scope of the following claims.

What is claimed is:

1. A method comprising:

storing a minimum spacing for a transaction type in a memory;

monitoring data transactions between a first agent and a second agent connected by a parallel terminated bus;

performing a latch back operation when required; and executing a subsequent transaction following a prior transaction using the minimum spacing for the prior transaction type stored in the memory, if the latch back operation does not occur.

2. The method of claim 1, wherein monitoring includes at least one of:

counting last strobe signals between the first agent and the second agent;

counting outstanding transactions between the first agent and the second agent; and tracking the status of a drive enable signal.

3. The method of claim 2, wherein a latch-back operation is performed when the drive enable signal is off and the count of the last strobe signals equals the count of the outstanding transactions.

4. The method of claim 1, further comprising capturing the last value present on the parallel terminated bus for use in a latch-back operation.

5. The method of claim 1, further comprising utilizing a knob to adjust a processor drive operation.

6. The method of claim 5 wherein the knob is used to adjust at least one of a processor drive cut-off operation and a processor drive latch-back operation.

7. A method for operating a computer system comprising:

transferring data transactions between a processor and a cache over a parallel terminated bus;

monitoring the data transactions;

performing a latch back operation when required; and executing a subsequent transaction following a prior transaction using a minimum spacing corresponding to the prior transaction type stored in a memory, if the latch back operation does not occur.

8. The method of claim 7, wherein monitoring includes at least one of:

counting last strobe signals between the processor and the cache;

counting outstanding transactions between the processor and the cache; and tracking the status of a drive enable signal.

9. The method of claim 8, wherein a latch-back operation is performed when the driven enable signal is off and the count of the last strobe signals equals the count of the outstanding transactions.

10. The method of claim 7, further comprising capturing the last value present on the parallel terminated bus for use in a latch-back operation.

11. The method of claim 7, further comprising utilizing a knob to adjust a processor drive operation.

12. The method of claim 11, wherein the knob is used to adjust at least one of a processor drive cut-off operation and a processor drive latch-back operation.

13. An article comprising a computer readable medium which stores computer executable instructions for operating a system, the instructions causing a computer to:

transfer data transactions between a first agent and a second agent connected by a parallel terminated bus;

monitor the data transactions;

perform a latch back operation when required; and execute a subsequent transaction following a prior transaction using a minimum spacing, if the latch back operation does not occur.

14. The article of claim 13, wherein the instructions cause a computer to monitor by at least one of counting last strobe signals between the first and second agents, counting outstanding transactions between the first and second agents, and tracking the status of a drive enable signal.

15. The article of claim 14, the instructions further causing a computer to perform a latch-back operation if the drive enable signal is off and the count of the last strobe signals equals the count of the outstanding transactions.

16. The article of claim 13, the instructions further causing a computer to capture the last value present on the parallel terminated bus for use in a latch-back operation.

17. A system comprising;

a first agent;

a second agent; and a parallel terminated bus coupling the first agent to the second agent, wherein the first and second agents are capable of driving data, control, address, strobe and other signals onto the bus, and wherein last strobe signals and outstanding transactions are counted and the status of a drive enable signal is monitored such that a subsequent transaction may be executed at an earlier time following a prior transaction, if a latch back signal is not required.

18. The system of claim 17, further comprising a memory coupled to at least one of the agents for storing minimum spacing data for transaction types.

19. The system of claim 17, wherein at least one agent comprises:

a latch-back controller;

a drive enable circuit connected to the latch-back controller; and an input/output buffer circuit connected to the drive enable circuit and to the bus, for driving a signal onto the bus when required.

20. The system of claim 19, wherein the latch-back controller further comprises:

at least one synchronous strobe counter for tracking the first agent transactions;

first and second source synchronous counter circuits for tracking outstanding second agent replies;

a comparator circuit connected to the source synchronous strobe counter and to the first and to the second synchronous counter circuits; and an AND circuit connected to outputs of the comparator, the first synchronous counter circuit, and the drive enable circuit, for generating a latch-back pulse.

21. The system of claim 19, wherein the drive enable circuit comprises an asynchronous reset-preset priority flip-flop.

22. The system of claim 19, wherein the input/output buffer circuit comprises:

a multiplexer circuit connected to the drive enable circuit; and a plurality of buffers for storing and releasing a value that appeared on the bus or another value depending upon instructions from a processor core.

* * * * *